Sept. 7, 1954          G. P. HAYNES ET AL          2,688,360
FUEL COMBUSTION SYSTEM, INCLUDING GAS ASSISTED ATOMIZER
Filed April 13, 1951          3 Sheets-Sheet 3
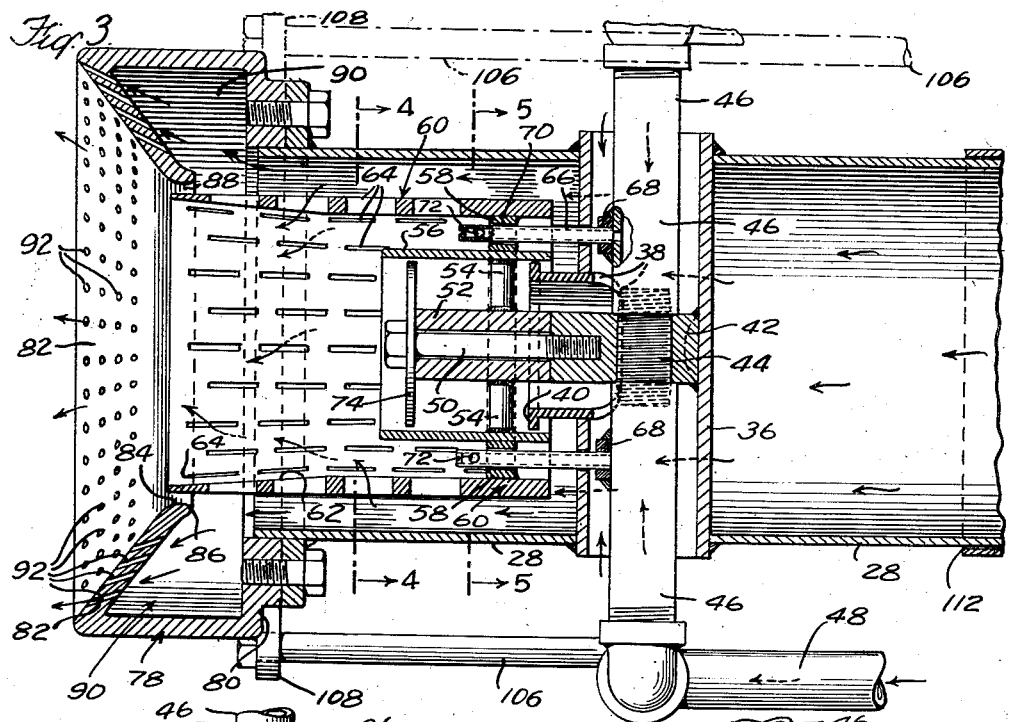
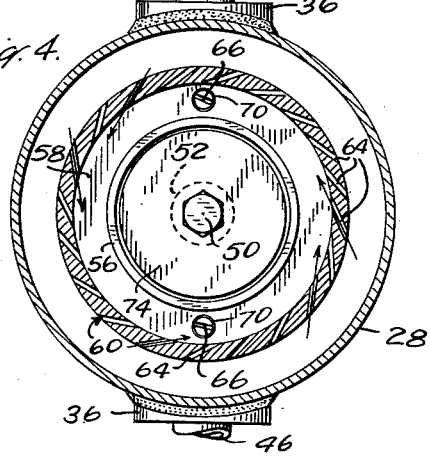
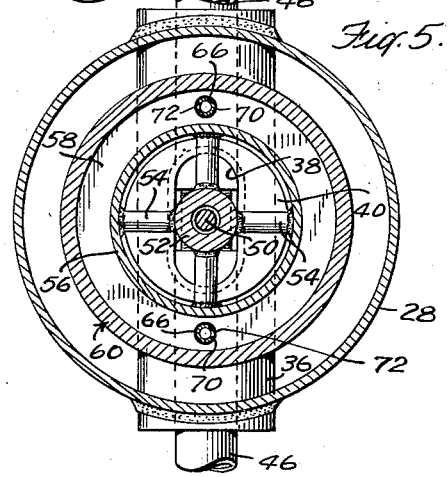
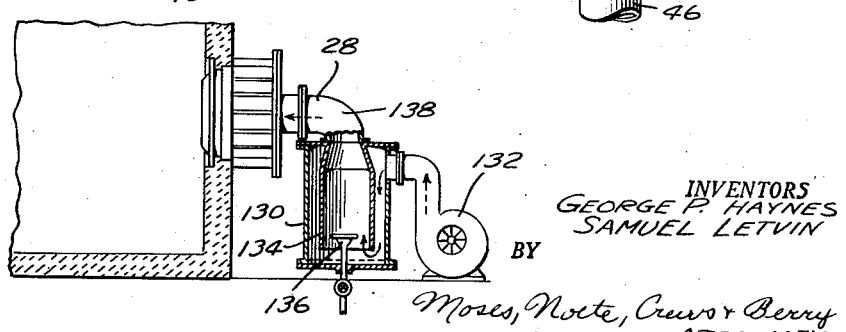
INVENTORS
GEORGE P. HAYNES
SAMUEL LETVIN
BY
Moses, Nolte, Cruvo & Berry
ATTORNEYS Patented Sept. 7, 1954

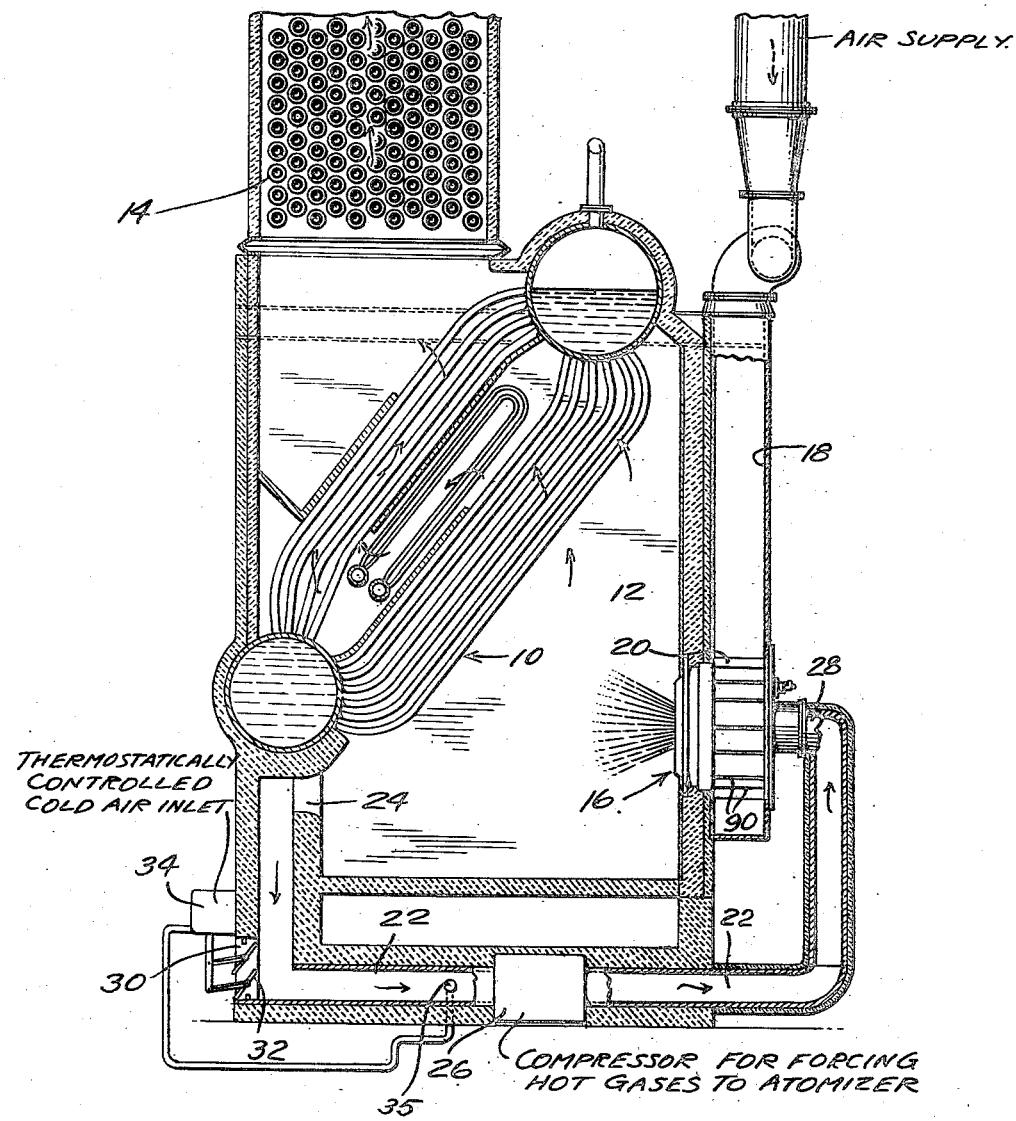

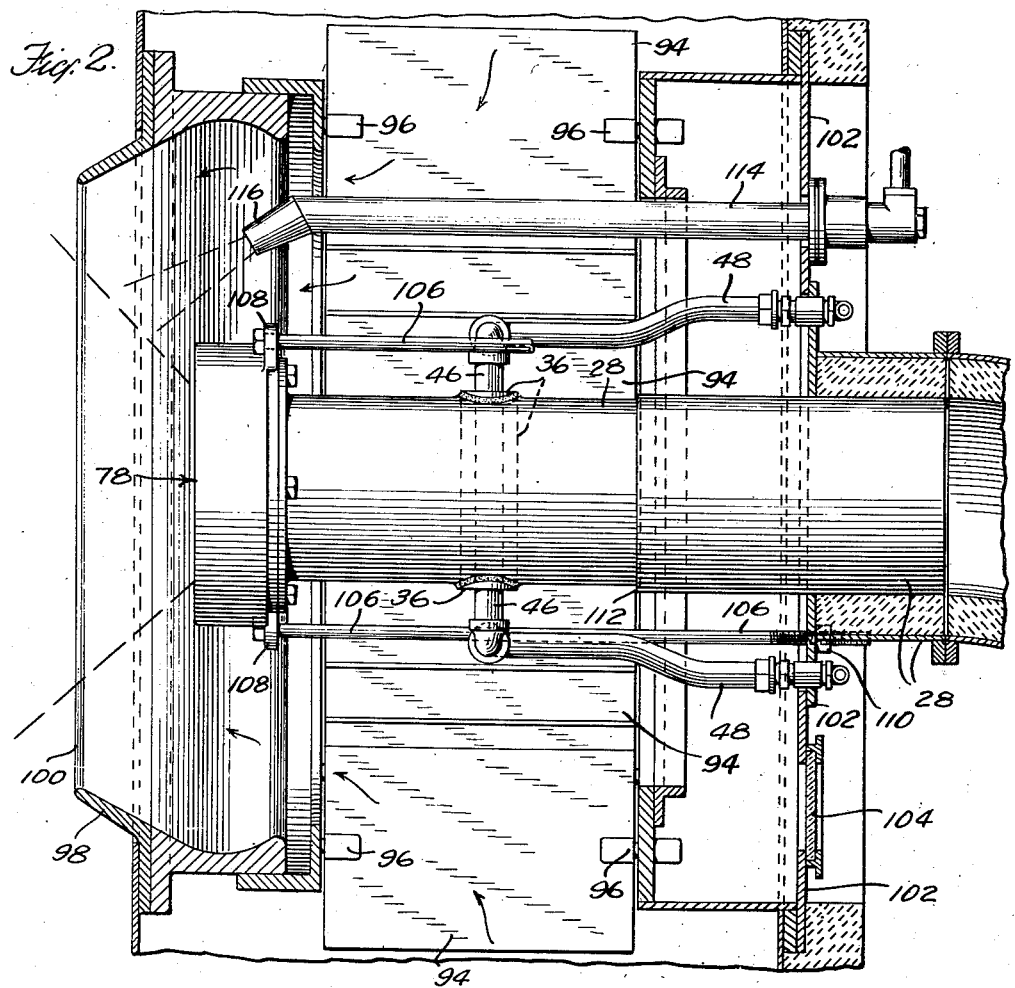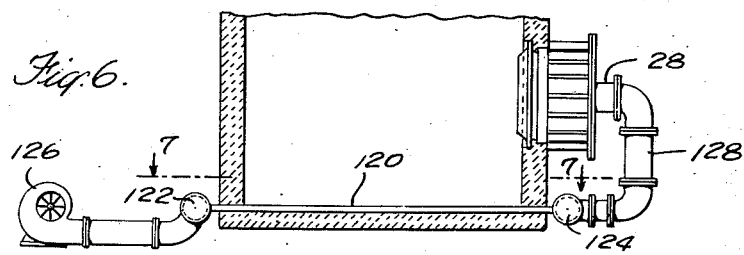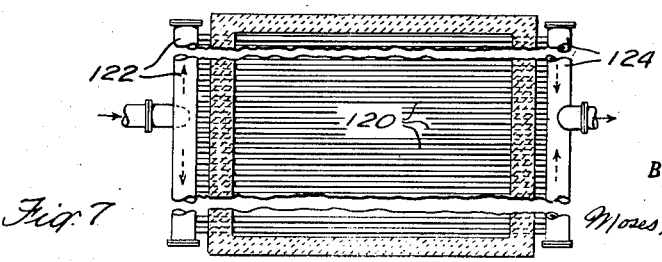

2,688,360

UNITED STATES PATENT OFFICE 2,688,360

FUEL COMBUSTION SYSTEM, INCLUDING GAS ASSISTED ATOMIZER

George P. Haynes, Hempstead, and Samuel Letvin, Elmhurst, N. Y., assignors to Thermo Projects Incorporated, a corporation of New York Application April 13, 1951, Serial No. 220,860

19 Claims. (Cl. 158—1)

This invention relates to fuel combustion systems for burning liquid fuels and particularly to gas assisted atomizers for use therein.

In the combustion of fuel oils, particularly the heavy oils, effective atomization of the oil is of prime importance, as such atomization is necessary to produce complete burning of the fuel, and also insure the minimum formation of carbon deposits and slags in the furnace. It is also important to provide an atomizer system which will operate satisfactorily throughout a large range of combustion rates.

In accordance with the present invention an atomizer is provided in which hot combustion gases or heated air are introduced in such a way as to effect a very complete atomization before the secondary air supply is mixed with the fuel. Such assisting gas may conveniently be provided by utilizing a part of the products of the combustion from the furnace, which are recirculated to the atomizer. The system of the present invention is effective within a substantial variation of temperature ranges, does not require excessive fuel oil pressures, and provides a system which may be operated with simplified automatic controls. Also the oil feed passages of the burner are of relatively large size so that danger of clogging is minimized. Control means for the introduction of the secondary air supply may also be simplified and draft losses through the air regulator minimized. Temperatures of the fuel oil as supplied to the burner can also be lowered. For example instead of preheating the oil to the temperatures commonly necessary at present of from 130° to 150° F., the oil may be supplied at temperatures of from 70° to 100° F., in some cases even less.

The present invention also provides a fuel combustion system by which the fuel can be completely and cleanly burned with practically zero excess air. For some uses, this is very important, not only as promoting efficiency in the use of the fuel, but also for producing a substantially non-oxidizing atmosphere in the furnace. For the latter reason the system is applicable to various metallurgical processes such as for heating billets for steel process work and also as applied to open hearth furnaces and under other conditions where a non-oxidizing atmosphere is desirable.

The particular atomizer construction shown herein is an improvement upon or development of the form of atomizer shown in our application, Serial No. 689,158, filed August 8, 1946 now Patent No. 2,599,465, issued June 3, 1952. The atomizer of that application is illustrated specifically in connection with a fog generator, whereas the specific form of atomizer illustrated in the present case is applied to fuel combustion.

The general objects of the invention are to provide a fuel combustion system in which some or all of the advantages described are realized. Specific objects and advantages of the invention wall appear in connection with the description of one preferred embodiment thereof illustrative of the principles of the invention which will be described in detail in connection with the accompanying drawings forming a part of this specification.

In the drawings:

Figure 1 is a diagrammatic view in vertical section showing a boiler and furnace with one form of the improved atomizer applied thereto;

Figure 2 is a vertical sectional view of the air register, the atomizer being shown in elevation;

Figure 3 is a vertical section of the atomizer on a larger scale than Fig. 2;

Figure 4 is a transverse section on line 4—4 of Fig. 3;

Figure 5 is a similar section on line 5—5 of Fig. 3;

Figure 6 is a fragmentary diagrammatic view in vertical section showing the lower part of a boiler furnace with the air register thereon and illustrating a modified arrangement for heating primary air for an atomizer in the register;

Figure 7 is a horizontal sectional view on line 7—7 of Fig. 6; and

Figure 8 is a fragmentary diagrammatic view in vertical section showing part of the furnace and air register with another means for supplying heated primary air.

Referring to the drawings in detail, Fig. 1 illustrates one embodiment of the invention as applied to a boiler furnace. A conventional water tube boiler is shown at 10 mounted in a combustion chamber 12. The products of combustion pass out through an economizer 14 to a stack. The register and atomizer structure as a whole is indicated by numeral 16. The secondary air is supplied through a duct 18 to the air register 20 to which the air is forced under low pressure by a suitable blower. In the particular example shown heated gases are supplied to the atomizer through a duct 22 which connects with a port 24 in the combustion chamber wall. In the duct is a compressor 26 which draws the hot gases from the combustion chamber through the port 24 and compresses the gases to the desired pressure and forces them into the atomizer casing 28.

In order to reduce and regulate the temperature of the gases so as to maintain the temperature within the desired limits, cold air is admitted into the duct 22 through an inlet port 30 which is controlled by adjustable louver blades 32. These are preferably automatically controlled by a thermostatic control device 34, the temperature responsive element 35 of which is located at a suitable point such as in the duct 22 beyond the port 30. A very close regulation of the temperature has not been found necessary. The temperatures used will depend to some extent upon the nature of the fuel being burned. With the heavy grades of oil usually employed temperatures between 800° F. and 1300° F. have been found satisfactory.

The atomizer casing 28 is mounted in the air register structure and comprises a tube extending centrally across said structure. Extending transversely across the central part of the casing 28 is a supporting tube 36. Mounted in an opening in the side of the tube is a partly flattened pipe section 38 which terminates at its outer end in a circular flange 40 (Figs. 3 and 5). Mounted on the back of the tube 36 and projecting outwardly into the pipe section 38 is a block 42 having a threaded transverse bore therein in which is a screw-threaded plug or nipple member 44 the ends of which project outwardly as shown in dotted lines in Fig. 3. Screwed on these threaded ends are two oil pipe supply sections 46 which are connected to supply pipes 48 coming from a suitable source of oil under pressure (not shown). Mounted on a stud bolt 50 screwing into the end of the block 42 is a sleeve 52 which has arms 54 projecting radially therefrom which carry a sleeve 56. The end of the sleeve encloses the flange 40, a sufficient clearance being allowed to permit expansion and contraction. Mounted on the sleeve 56, preferably about opposite the ends of arms 54, is a ring 58 which carries an atomizer cup 60, the outer part of the inner surface of which may flare outwardly slightly as indicated at 62. The wall of the cup 60 is provided with a multiplicity of perforations or slots 64 which are preferably elongated in the direction of the axis of the cup and arranged in staggered rows. These slots 64 are inclined in a generally tangential direction as indicated in Fig. 4, so as to produce rapid rotation of gases entering the cup through these slots. Oil is supplied to the atomizer through axially extending pipes 66 screwing into bosses 68 on the side of pipes 46. The pipes 66 extend through holes 70 in the ring 58 and are closed at their outer ends. Each of the pipes has a transverse opening 72 into the bore in the pipe near its outer end. The openings 72 in the respective pipes face in tangential directions so that oil issuing from the holes 72 will be projected tangentially and will start the oil rotating in the same direction as the direction of rotation which will be given to the oil by the gases entering the cup through the slots 64. Oil is thus supplied to the atomizer cup and rotates rapidly therein as it mixes with the gases and passes out through the open end or mouth of the cup.

Mounted at the end of the sleeve 52 on the bolt 50 and near the outer end of the sleeve 56 is a baffle disc 74. The periphery of this is spaced from the inside of sleeve 56 so as to leave a narrow passageway around the disc. The baffle 74 is useful in preventing flames from extending into the sleeve 56.

The relatively high pressure hot air and gases from the duct 22 pass through the casing 28 around the supporting tube 36 and between the outside of the cup 60 and the casing 28, part of the air and gases entering the cup through the slots 64. Some of the low pressure air from the interior of the air register will pass through the tubes 36 and 38, sleeve 56 and the space around the baffle 74 into the interior of the cup. Thus it will prevent the formation of a vacuum in the center of the cup due to vortex action.

On the end of the casing 28 surrounding the mouth of the atomizing cup is a hollow diffuser ring 78. This is provided with a rear wall 80 attached to a flange at the end of the casing, and with an outer flaring or inclined wall 82. This outer or front wall 82 has a central opening 84 and preferably terminates in a curved flanged portion 86 forming the margin of the opening. The opening 84 is somewhat larger than the outer diameter of the cup 60 so as to provide an annular space 88, through which a part of the gases issues. A major portion of the gases from the space around the cup 60 passes into the hollow chamber 90 of the diffuser ring, and issues through a multiplicity of outwardly inclined holes 92 in the flaring wall 82 of the diffuser. The gases issuing through these holes 92 and through the space 88 draw out the finely atomized fuel issuing from the mouth of the cup so as to induce intimate intermixture between the secondary air from the register and the atomized fuel. A short, wide flame is thus produced which is most effective for use in a furnace of the general type illustrated. By proper design of the diffuser and associated parts the character and shape of the flame may be adapted to suit particular conditions of use.

With the construction of atomizer described, no oil passages of very fine gage are required. Therefore problems connected with the straining or filtering of the oil are simplified and danger of clogging is minimized. Very high oil pressures are not required, pressures on the order of 100 p. s. i. being ordinarily sufficient, as distinguished from many atomizers which require pressures up to as much as 1000 p. s. i.

The pressure of the assisting gases as produced by the compressor 26 may be varied within considerable limits, a desirable pressure with a burner of the proportions shown being in the neighborhood of 100 p. s. i. The main or secondary air supply which is at a very much lower pressure, perhaps 2 or 3 p. s. i., enters through the air register and is controlled in any suitable manner, as by the dampers 94 pivotally mounted at points 96 and controlled in any suitable manner (not shown). With the atomizer construction of the present invention it has been found that a close control of the dampers is not necessary, and in fact adjustable damper blades may in some instances be dispensed with.

The air entering between the damper blades passes into the venturi 98 which may be of usual construction, and mixes with the combustible gases passing into the furnace through the Venturi orifice 100. The general construction of the register may be conventional. It is shown as provided with an outer wall 102 in which is a sight glass 104. Supporting rods 106 are preferably provided connected to lugs 108 on the diffuser ring. These rods 106 pass through holes in the wall 102 and are engaged by adjusting nuts 110. By adjusting these nuts the position in the venturi of the mouth of the atomizer cup and of the diffuser ring may be varied. The casing 28 is provided with a telescopic portion 112 to permit such adjustment to be made.

The register is preferably provided with a suitable lighting off device, such as the retractable ignition tube 114 provided with a flame jet 116. This jet may be lighted in any suitable way as by an electric igniter (not shown).

The gas assisted system described by which heated gases under pressure are used for assisting in the atomization of liquid fuel may be used with various specific forms of atomizers designed to utilize such heated gases. Various modifications in the method of providing the hot gases or air under pressure may also be utilized in connection with the form of atomizer shown. The hot gases may produce some vaporization of the lighter ends of the liquid fuel, but the action is primarily a mechanical atomization. The heavy oils commonly used in a burner of this type do not readily vaporize, and the amount of heat used is insufficient to produce anything like complete vaporization or gasification prior to the actual flame formation in a combustion chamber.

Two constructions for providing heated primary air for assisting in the atomization of the fuel are shown by way of illustration as alternatives of the construction shown in Fig. 1. One such construction is shown in Figs. 6 and 7. Instead of the auxiliary air and hot gas supply being withdrawn directly from the furnace a series of heat exchanging tubes 120 are mounted in the furnace which are connected at their ends to manifolds 122 and 124. Air is forced into the manifold 122 by blower 126, passes through the heated tubes 120 and is carried from the manifold 124 through pipe 128 to the atomizer casing 28. This construction will provide pure heated air as distinguished from air mixed with hot products of combustion which are furnished to the atomizer by an arrangement such as shown in Fig. 1.

In Figure 8 another possible construction is illustrated for supplying assisting gases to the atomizer. In this construction a stove 130 is provided through which air is forced by a blower 132. In the stove construction illustrated the air passes downwardly through the outer casing of the stove and around the bottom edge of the combustion chamber 134. In the interior of the latter a small oil burner 136 is mounted which heats the air as the oil burns with a part of the air, so that hot air and gases pass out of the outlet 138 from the stove to the casing 28 of the atomizer. With this construction a considerable excess of air over that consumed by the burner 136 will be heated.

While certain preferred embodiments of the invention have been illustrated and described in detail, it is to be understood that changes may be made therein and the invention embodied in other structures. It is not, therefore, the intention to limit the patent to the specific constructions illustrated, but to cover the invention broadly in whatever form its principles may be utilized.

We claim:

1. A fuel combustion system comprising a combustion chamber, a register having a venturi opening into the combustion chamber, means for supplying secondary air to said register, a fuel atomizer in said register, said atomizer including an atomizer cup having a mouth opening into the venturi out of contact with the surrounding wall thereof, means for supplying fuel to the interior of the atomizer cup, and means for supplying hot gases under pressure to said atomizer to assist in the atomization of the fuel, said last named means including a duct communicating with the combustion chamber and leading to the atomizer, means for raising the pressure of gases withdrawn from the combustion chamber and forced through said duct to the atomizer, and valve means for admitting a regulated amount of cooler air into said duct.

2. A combustion system including a combustion chamber, air register means including a venturi opening into said chamber, means for supplying secondary air to said air register means, a fuel atomizer discharging into said venturi, said fuel atomizer including a duct for hot gases opening into the venturi and an atomizing cup mounted in the discharge end of said duct, said cup being smaller in diameter than the discharge end of the duct, so as to leave a gas discharge space around the cup, said cup having tangentially inclined orifices in the wall thereof for admitting hot gases from said duct to the interior of said cup, said cup having a mouth opening into the venturi adjacent to the end of the duct, and means for discharging liquid fuel under pressure into said atomizing cup.

3. A combustion system including a combustion chamber, air register means including a venturi opening into said chamber, means for supplying secondary air to said air register means, a fuel atomizer discharging into said venturi, said fuel atomizer including a duct for hot gases opening into the venturi and an atomizing cup mounted in the discharge end of said duct, said cup being smaller in diameter than the discharge end of the duct, so as to leave a gas discharge space around the cup, said cup having substantially tangential orifices in the wall thereof for admitting hot gases from said duct to the interior of said cup, said cup having a mouth opening into the venturi adjacent to the end of the duct, and means for discharging liquid fuel under pressure into said atomizing cup, said last named means having orifices for discharging fuel into the cup near the inner surface thereof.

4. A combustion system including a combustion chamber, air register means including a venturi opening into said chamber, means for supplying secondary air to said air register means, a fuel atomizer discharging into said venturi, said fuel atomizer including a duct for hot gases opening into the venturi and an atomizing cup mounted in the discharge end of said duct, said cup having substantially tangential orifices in the wall thereof for admitting hot gases from said duct to the interior of said cup, said cup having a mouth opening into the venturi adjacent to the end of the duct, means for discharging liquid fuel under pressure into said atomizing cup, and a flame guard disc mounted transversely of the axis of the cup so as to leave an annular space for the exit of air around the periphery of said disc.

5. A combustion system including a combustion chamber, air register means including a venturi opening into said chamber, means for supplying secondary air to said air register means, a fuel atomizer discharging into said venturi, said fuel atomizer including a duct for hot gases opening into the venturi and an atomizing cup mounted in the discharge end of said duct, said cup having substantially tangential orifices in the wall thereof for admitting hot gases from said duct to the interior of said cup, said cup having a mouth opening into the venturi adjacent to the end of the duct, means for discharging liquid fuel under pressure into said atomizing cup, a hollow diffusing ring mounted on the end of the duct and having a central opening into which the mouth of the cup projects, said opening being of larger diameter than the outer diameter of the cup so as to provide an annular space for the discharge of gases, the interior of said hollow diffusing ring communicating with said duct so that gases from the duct will flow into said diffusing ring, the front wall of said diffusing ring being provided with a plurality of perforations permitting escape of said gases.

6. The construction as claimed in claim 5 in which the front wall of the diffusing ring flares outwardly and the perforations in said wall are outwardly inclined.

7. In an atomizer of the character described, a casing for receiving heated gases under pressure, said casing terminating in an open end, a hollow diffusing ring mounted on the open end of said casing, said diffusing ring having a front wall provided with a central opening surrounded by a series of outwardly inclined discharge passages for the discharge of heated gases from the casing, an atomizing cup mounted in the open end of the casing concentrically therewith so as to leave an annular gas discharge space around the cup, the mouth of the cup projecting through the central opening in the diffusing ring, said cup having tangentially inclined openings through the side wall thereof for permitting hot gases under pressure to pass from the casing into the interior of the cup, and means for discharging liquid fuel under pressure into the cup.

8. In an atomizer of the character described, a casing for receiving heated gases under pressure, said casing terminating in an open end, a hollow diffusing ring mounted on the open end of said casing, said diffusing ring having a front wall provided with a central opening surrounded by a series of discharge passages for the discharge of heated gases from the casing, an atomizing cup mounted in the open end of the casing concentrically therewith so as to leave an annular gas discharge space around the cup, the mouth of the cup projecting through the central opening in the diffusing ring, said cup having tangentially inclined openings through the side wall thereof for permitting hot gases under pressure to pass from the casing into the interior of the cup, and means for discharging liquid fuel under pressure into the cup, said last named means including an oil discharging member in the cup having a substantially tangential outlet opening near the inner surface of the cup.

9. In an atomizer of the character described, a casing for receiving heated gases under pressure, said casing terminating in an open end, an atomizing cup mounted in the open end of the casing concentrically therewith, the outer diameter of the cup being smaller than the diameter of the open end of the casing so as to leave an annular gas discharge space around the cup, said cup having tangentially inclined openings through the side wall thereof for permitting hot gases under pressure to pass from the casing into the interior of the cup, a sleeve mounted concentrically within the cup, an oil discharging member having a substantially tangential outlet opening discharging into the space between the inner surface of the cup and outer surface of the sleeve, and means for admitting air through said sleeve into the central portion of the cup.

10. In an atomizer of the character described, a casing for receiving heated gases under pressure, said casing terminating in an open end, an open ended supporting tube of less diameter than the casing, mounted transversely across the casing, an atomizing cup mounted in the open end of the casing concentrically therewith, the outer diameter of the cup being smaller than the diameter of the open end of the casing so as to leave an annular gas discharge space around the cup, said cup being supported by said transverse supporting tube, means passing through the transverse supporting tube for discharging liquid fuel under pressure into the cup, and means for admitting air from the transverse supporting tube into the central part of the cup.

11. In an atomizer of the character described, a casing for receiving heated gases under pressure, said casing terminating in an open end, an open ended supporting tube of less diameter than the casing mounted transversely across the casing, an atomizing cup mounted in the open end of the casing concentrically therewith, the outer diameter of the cup being smaller than the diameter of the open end of the casing so as to leave an annular gas discharge space around the cup, said supporting tube having an opening in the side thereof facing towards the open end of the casing, a supporting member fixed to the back inside wall of the supporting tube opposite to the opening in the tube, supporting arms mounted on said supporting member in front of the opening in said tube, means for mounting said atomizing cup on said arms, and duct means extending from the interior of said cup to the opening in said supporting tube for admitting air through said duct means to the interior of the atomizing cup, and means for discharging liquid fuel under pressure into the interior of the cup near the inner surface thereof.

12. The construction as claimed in claim 11 in which the duct means include a sleeve carried by the arms inside of the rear part of the cup and concentric therewith, and a fire guard disc mounted in the outer part of said sleeve.

13. The construction as claimed in claim 11 in which the atomizing cup has tangentially inclined openings through the side wall thereof and in which the means for discharging liquid fuel include oil supply pipes mounted in the transverse supporting tube and jet pipes connected to said oil supply pipes and projecting into the rear part of the atomizing cup near the periphery thereof, said jet pipes having tangential discharge openings arranged to discharge oil in the same rotary direction as the rotation produced in the cup by gases entering through the tangential openings in the cup wall.

14. A fuel combustion system comprising a combustion chamber, a register having a venturi opening into the combustion chamber, means for supplying secondary air to said register, a duct having its discharge end located in said venturi out of contact with the surrounding wall thereof, said duct being connected at its inlet end to the combustion chamber, means for raising the pressure of gases withdrawn from the combustion chamber and forcing the same through said duct, a fuel atomizer cup concentrically mounted in the discharge end of said duct with its open end facing in the direction of gas discharge, said cup being smaller in diameter than the discharge end of said duct so as to leave a gas outflow space around the cup, means for discharging liquid fuel into the interior of the cup, and means for admitting hot gases from said duct into the interior of the cup.

15. A system for burning liquid fuel in a combustion chamber comprising a register having a venturi opening into the combustion chamber, means for supplying secondary air to said register, a duct having its discharge end located in said venturi concentric with the axis and out of contact with the surrounding wall thereof, means for supplying a blast of heated gases to said duct, a fuel atomizer cup concentrically mounted in the discharge end of said duct with its open end facing in the direction of gas discharge, said cup being smaller in diameter than the discharge end of said duct so as to leave a gas outflow space around the cup, means for discharging liquid fuel into the interior of the cup, and means for admitting hot gases from said duct into the interior of the cup.

16. A system for burning liquid fuel in a combustion chamber comprising a register having a venturi opening into the combustion chamber, means for supplying secondary air to said register, a duct having its discharge end located in said venturi concentric with the axis and out of contact with the surrounding wall thereof, means for supplying a blast of heated gases to said duct, a fuel atomizer cup concentrically mounted in the discharge end of said duct with its open end facing in the direction of gas discharge, said cup being smaller in diameter than the discharge end of said duct so as to leave a gas outflow space around the cup, means for adjusting the position of the discharge end of said duct axially of the venturi, means for discharging liquid fuel into the interior of the cup, and means for admitting hot gases from said duct into the interior of the cup.

17. A system for burning liquid fuel in a combustion chamber comprising a register having a venturi opening into the combustion chamber, means for supplying secondary air to said register, a duct having its discharge end located in said venturi concentric with the axis and out of contact with the surrounding wall thereof, means for supplying a blast of heated gases to said duct, a fuel atomizer cup concentrically mounted in the discharge end of said duct with its open end facing in the direction of gas discharge, said cup being smaller in diameter than the discharge end of said duct so as to leave a gas outflow space around the cup, said cup having a series of tangentially inclined openings through the side wall thereof for permitting hot gases under pressure to pass from the duct into the interior of the cup, and means for discharging liquid fuel under pressure into the interior of the cup.

18. A system for burning liquid fuel in a combustion chamber, comprising a register having a venturi opening into the combustion chamber, means for supplying secondary air to said register, a duct having its discharge end located in said venturi concentric with the axis thereof, the end of said duct having a hollow diffuser ring mounted thereon, the outer diameter of which is smaller than the inner diameter of the venturi so as to leave a space for the discharge of said secondary air outside of said diffuser ring, said diffuser ring having a front wall provided with a central opening surrounded by a series of discharge passages for the discharge of gas from the duct, means for supplying a blast of gas to said duct, a fuel atomizer cup concentrically mounted in the discharge end of said duct with its open end facing in the direction of gas discharge, said cup being smaller in diameter than the discharge end of said duct, so as to leave a gas outflow space around said cup, means for discharging liquid fuel into the interior of the cup and means for admitting gases from said duct into the interior of the cup.

19. The construction as claimed in claim 18 in which the front wall of the diffusing ring flares outwardly and the discharge passages therethrough surrounding the central opening are outwardly inclined.

References Cited in the file of this patent

UNITED STATES PATENTS

| Number | Name | Date |
|---|---|---|
| 964,031 | Leahy | July 12, 1910 |
| 1,073,108 | Eldred | Sept. 16, 1913 |
| 1,513,622 | Manning | Oct. 28, 1924 |
| 1,617,609 | Smith | Feb. 15, 1927 |
| 1,729,763 | De Florez | Oct. 1, 1929 |
| 1,753,432 | Isom | Apr. 8, 1930 |
| 1,839,512 | Waterman | Jan. 5, 1932 |
| 1,896,910 | Merkt | Feb. 7, 1933 |
| 1,943,053 | Boisset | Jan. 9, 1934 |
| 2,126,417 | Sharp | Aug. 9, 1938 |
| 2,174,663 | Keller | Oct. 3, 1939 |
| 2,175,866 | Arnold | Oct. 10, 1939 |
| 2,242,797 | Lucke | May 20, 1941 |